United States Patent [19]

Bergstrom et al.

[11] Patent Number: 4,877,685

[45] Date of Patent: Oct. 31, 1989

[54] MODIFIED POLYOLEFINE

[75] Inventors: Christer Bergstrom; Tor H. Palmgren, both of Helsinki, Finland

[73] Assignee: Neste Oy, Finland

[21] Appl. No.: 55,032

[22] Filed: May 28, 1987

[30] Foreign Application Priority Data

May 28, 1986 [FI] Finland .................................. 862263

[51] Int. Cl.$^4$ ............................................ B32B 15/08
[52] U.S. Cl. ...................................... 428/500; 428/463; 428/483; 428/476.3; 428/522; 525/301; 525/285
[58] Field of Search ................ 525/301, 285; 428/461, 428/463, 483, 476.3, 522

[56] References Cited

U.S. PATENT DOCUMENTS

| | | | |
|---|---|---|---|
| 3,949,019 | 4/1976 | Zeitler et al. ........................ | 525/301 |
| 3,966,845 | 6/1976 | Van Brederode et al. ........... | 525/78 |
| 4,419,408 | 12/1983 | Schmukler et al. .............. | 428/424.4 |
| 4,440,911 | 4/1984 | Inoue et al. .......................... | 525/285 |
| 4,507,423 | 3/1985 | Sasaki et al. ........................ | 524/427 |
| 4,556,690 | 12/1985 | Nakagawa ............................ | 525/64 |

FOREIGN PATENT DOCUMENTS 946384  1/1964  United Kingdom ................ 525/285

Primary Examiner—Edith Buffalow
Attorney, Agent, or Firm—Steinberg & Raskin

[57] ABSTRACT

The present invention relates to a modified polyolefine which has good adhesion to metals and to polar substances. The polyolefine is admixed with or grafted to fumaric acid. The fumaric acid may be added at about 0.01–20%, preferably 0.01–1% of the polyolefine weight, while the preferred polyolefine is an ethylene copolymer.

18 Claims, No Drawings

MODIFIED POLYOLEFINE

BACKGROUND OF THE INVENTION

The present invention relates to a modified polyolefine which has good adhesion to metals and to other polar substances.

Polyethylene and polyolefines on the whole are characterized by poor adhesion to metals and to materials containing polar groups. Somewhat better adhesion is achieved in certain instances by copolymerizing unsaturated esters, such as vinylacetate or alkyl(meth)acrylate (methylacrylate, ethylacrylate, butylacrylate, etc.), however these copolymers also present inadequate adhesion in most multi-layer structures.

Various ways have been tried to improve this adhesion. Unsaturated acids or acid anhydrides, among others, have been used as comonomers in polymerizing copolymers or terpolymers of ethylene. Examples of commercial applications are ethylene/acrylic acid copolymer which contains 9% acrylic acid, and ethylene/methacrylic acid copolymer which contains 9% methacrylic acid. A known commercial terpolymer contains 4% acrylic acid and 7% butylacrylate. A product in which the methacrylic acid has partially been neutralized to salt so that a so-called ionomer has been obtained, is also commercially available. An example of the use of maleic acid anhydride towards improving adhesion, is the application in which maleic acid anhydride has been grafted to LDPE, HDPE or EVA. Another example is the terpolymer of ethylene, butylacrylate and maleic acid anhydride.

Direct copolymerizing of ethylene with an unsaturated acid is disadvantageous for several different reasons. The acids are corrosive and reduce the service life of the apparatus both in the synthesis step and in the shaping step. Moreover, these ehtylene/acid copolymers or terpolymers are thermally unstable, with the consequence that low working temperatures have to be employed, with restrictions on production rate and product quality following therefrom. High acid quantities are indispensable for achieving satisfactory adhesion because these copolymerized acids are immobile. It is therefore difficult for these acids to exit from the polymer matrix and to reach the polar groups in the boundary layer. Large acid quantities are also required in order to reduce crystallinity, this being indispensable for achieving adhesion. This may naturally be attained by using a third monomer, such as butylacrylate or vinylacetate for example.

Terpolymers are, however, uneconomical in view of recovery of the comonomers in the synthesis. Therefore, the content of the comonomer which is active regarding adhesion, is limited. The total comonomer content is also limited by laws in various countries regarding foodstuff compatibility. Crystallinity may also be lowered by admixing thermoplastic elastomer, e.g. polyisobutylene (PIB). For instance, attempts have been made when grafting maleic acid anhydride to improve mobility thereof by using spacer groups between the maleic acid anhydride and the polymer (Diels-Alder reaction between diene and maleic acid anhydride, and grafting of the same with the polymer).

SUMMARY OF THE INVENTION

Accordingly, it is an object of the present invention to achieve improvement over presently-known modified polyolefine polymers, notably over modified polyethylene polymers.

The present invention is principally characterized by a polyolefine being admixed with or grafted to fumaric acid.

DESCRIPTION OF THE PREFERRED EMBODIMENTS

When a polyolefine is admixed with or grafted to fumaric acid in the manner, the situation becomes much more favorable, than in the situations noted above with respect to the prior art. Fumaric acid is remarkably less corrosive than, e.g., acrylic acid, methacrylic acid, or maleic acid anhydride. Much lower quantities can be used when admixing or grafting fumaric acid to a polyolefine, than in the copolymerizing of unsaturated acids. When fumaric acid is admixed with or grafted to polyolefine, the adhesion obtained is better with a lower degree of crystallinity, because a lower degree of crystallinity induces lower stresses in the boundary surface.

Polyolefines with a low degree of crystallinity which are suitable for this purpose are, e.g., EBA (ethylene/butylacrylate), EEA (ethylene/ethylacrylate), EMA (ethylene/methacrylate), and EVA (ethylene/vinylacetate). Also, VLDPE (very low density polyethylene), which is prepared by the coordination polymerizing method from ethylene and a higher alpha-olefine, is appropriate for this use.

It is possible to obtain sufficiently good adhesion at acid content which is below 1%, when admixing or grafting polyolefines having a low degree of crystallinity with fumaric acid. An acid content as low as this, is highly favorable if the raw material costs, the service life of the equipment (minimal corrosion), and the manufacturing technique (the concentrate may be diluted) are taken into account. Furthermore, fumaric acid is less corrosive than, e.g., acrylic acid, methacrylic acid, or maleic acid anhydride, which cause corrosion and thereby discolouring of the product, also at very low content.

Fumaric acid is also much more favorable in view of labour hygiene and foodstuff compatibility, and is easier to handle in production because it is in solid state and has a high boiling point. Fumaric acid grafts far more efficiently than e.g. acrylic acid, methacrylic acid or maleic acid anhydride which tend to boil off in connection with compounding, and which furthermore are incompletely grafted.

When admixing or grafting fumaric acid, much lower acid content may be used. For this reason, better thermal stability is obtained, so that lower comonomer content can be used. In this manner, the foodstuff compatibility requirements of various applications can be met. By admixing polyolefines of low degree of crystallinity with fumaric acid, good adhesion characteristics are obtained even without grafting (i.e., without radical formers).

When polyolefines are modified with fumaric acid as in the present invention, the starting material is the above-noted polyolefine, about 0.01–20% by weight, preferably about 0.01–1% by weight fumaric acid, and about 0–0.5% radical former (based on the weight of the polyolefine). These ingredients are mixed at a temperature at which the mix is in molten state and the radical former is decomposed and forms those radicals which effect grafting. The mixing may be done in a batch process or continuously, while the components may be added all at one time, separately, or in pairs. If the formulation contains a radical former, it is advantageous to first melt-homogenize the mix at a lower temperature, and then to raise the temperature to a level at which the radical former will produce radicals.

When a polyolefine is admixed or grafted with fumaric acid, any polyolefine whatsoever may be used for basic polymer. However, it is most advantageous to use an ethylene copolymer which has the lowest possible degree of crystallinity. It is possible to use, e.g. LDPE, HDPE, MDPE, LLDPE, PP, and PB. However, it is preferable to use EVA, EBA, EEA, EMA, VLDPE, or other ethylene copolymers or polymer mixtures which are as amorphous as possible. The degree of crystallinity can be efficiently lowered by adding, e.g., a thermoplastic elastomer. Organic peroxides, peresters, percarbonates, or other types of radical former may be used for the radical former. Usually, cumylperoxide, cumyltertiary butylperoxide or ditertiary butylperioxide is used. Additionally, the formulation may contain chain transfer agents, antioxidants, or other additives typical of polyolefines.

The polyolefine admixed or grafted with fumaric acid in the described manner, may be used for so-called adhesion plastics in the manufacturing of multi-layer products which contain one or several polyolefine layers, and one or several layers of a polar plastic (such as polyamide, EVOH, etc.) or of metal (such as aluminum, steel, copper, etc.). Such multi-layer products may be manufactured by coextrusion, by (co)extrusion coating, or by (co)extrusion aluminizing, while films, sheets, tubes, cables, bottles, etc. may be involved. In powder coating of steel tubes for example, such adhesion plastics may also be used for an adhesion layer. In so-called plastic alloys, which are composed of immiscible plastics (e.g. polar and non-polar), these adhesion plastics may also be used as so-called emulsifier polymers to obtain adhesion between the two phases, and thereby better technical characteristics. The adhesion to other polar materials (e.g. glass, mineral, wood) may also be improved in this manner.

The present invention will now be described in greater detail with the aid of the following, non-restrictive examples:

EXAMPLE 1

EBA (MI=4, Ba 17%) was extruded together with 0.05% ditertiary butylperoxide and an unsaturated acid (fumaric acid, FA; acrylic acid, AA) in a Brabender extruder $\phi=19$ mm, L=20 D, and compression ratio 3:1). The temperature in the extruder was 105° C., 200° C. and 250° C. and in the nozzle 250° C. The nozzle was of a coextrusion type while PA-6 (BASF Ultramid B4) was extruded for a second layer at 250° C. In the grafting extruder, the speed of rotation of the screw was 41 min$^{-1}$. In this manner, two-layer strips were extruded (acid-grafted polymer and PA-6), which were tested after 24 hours for adhesion. The test was performed with an Instron pull tester (Peeltest), the pulling rate being 50 mm/min. The force was measured after equilibrium had been obtained, and was expressed in N/cm.

It can be seen in Table I how the acid content (FA,AA) affects the adhesion:

TABLE I

| Acid content | Adhesion (N/cm) | |
| % | FA | AA |
| --- | --- | --- |
| 0.075 | 23.3 | 7.5 |
| 0.15 | 43.0 | 12.1 |

TABLE I-continued

| Acid content | Adhesion (N/cm) | |
| % | FA | AA |
| --- | --- | --- |
| 0.3 | 48.1 | 9.6 |
| 0.5 | 50.6 | 46.3 |
| 1.0 | 14.8 | 37.3 |

It is observed from these results that if the butylacrylate content is as high as 17%, it is possible to manage with very low acid content (<1%). When the acid content is very low, fumaric acid improves the additivity more than acrylic acid. It may be noted for comparison, that the adhesion of non-grafted 17% EBA is 0.5 N/cm, with 0.1 N/cm being obtained if non-grafted polyethylene is used.

EXAMPLE 2

In this instance, the testing was carried out as in Example 1, with the exception that EVA (MI=11, VA=19%) was used instead of EBA:

TABLE II

| Acid content | Adhesion (N/cm) | |
| % | FA | AA |
| --- | --- | --- |
| 0.075 | 60.1 | 6.9 |
| 0.15 | 70.3 | 16.9 |
| 0.3 | 56.2 | 28.8 |
| 0.5 | 52.5 | 30.1 |
| 1.0 | 30.1 | 32.6 |

These results reveal that markedly better adhesion is also obtained in the case of high vinylacetate content with low fumaric acid content than with acrylic acid. It may be noted for comparison tht the adhesion of non-grafted 19% EVA is 0.5 N/cm.

EXAMPLE 3

In this case, testing was performed as in Example 2, with the exception that the vinylacetate content of the EVA brand was lowered to 9% (MI=9), and to 0% (MI=7.5). Only fumaric acid was used for grafting, at 0.15% and 0.5%.

TABLE III

| VA content | Adhesion (N/cm) | |
| % | 0.15% FA | 0.5% FA |
| --- | --- | --- |
| 0 | 5.2 | 3.3 |
| 9 | 11.3 | 8.0 |
| 19 | 70.3 | 52.5 |

These results reveal that the vinylacetate content (the amorphism) has a decisive effect on the adhesion of fumaric acid.

EXAMPLE 4

In this instance, the testing was accomplished as in Examples 1 and 2, with the exception that no ditertiary butylperoxide was added at all. 0.5% fumaric acid was added to 17% EBA and to 19% EVA without grafting with the aid of peroxide:

TABLE IV

| Brand | Adhesion (N/cm) |
| --- | --- |
| EBA + 0.5% FA | 12.0 |
| EBA + 0.5% FA (grafted) | 50.6 |
| EVA + 0.5% FA | 19.6 |
| EVA + 0.5% FA (grafted) | 52.5 |

These results reveal that fumaric acid also causes adhesion with respect to polyamide, without grafting using peroxide. The level is however lower than in the case where the fumaric acid is grafted. This special feature of fumaric acid considerably facilitates the manufacturing of adhesion plastic. It may be produced without using peroxide, which as a byproduct causes gels, while mixing may be effected with mixers having a very short retention time.

EXAMPLE 5

In this instance, testing was accomplished as in Examples 1–3, with the exception that comparisons were instituted concerning adhesion to various materials (Polyamide:6, BAF Ultramid B4; ethylene/vinylalcohol, VAL-F; aluminum, steel). A nozzle was constructed for metal coating through which the metal strip (20 mm × 1.0 mm) could be pushed. EBA (MI=4, BA=17%) and EVA (MI=11, VA=19%) were grafted with 0.15% and 0.5% fumaric acid. Table V reveals how the grafted copolymers and their basic polymers adhere to various materials:

TABLE V

| Polymer | Adhesion (N/cm) | | | |
|---|---|---|---|---|
| | PA-6 | EVOH | Al | Fe |
| EBA + 0.15% FA (grafted) | 43.0 | 6.9 | 31.3 | 18.2 |
| EBA + 0.5% FA (grafted) | 50.6 | 21.8 | 34.0 | 32.7 |
| EBA | 0.5 | 3.0 | 10.5 | 9.8 |
| EVA + 0.15% FA (grafted) | 70.3 | 18.0 | 34.0 | 25.2 |
| EVA + 0.5% FA (grafted) | 52.5 | 38.2 | 41.7 | 29.3 |
| EVA | 0.5 | 1.1 | 14.2 | 6.1 |

It is seen from these results that both 17% EBA and 19% EVA exhibit some adhesion to aluminum and to steel, but a marked improvement is achieved by grafting fumaric acid to the same. The adhesion is on the same order for EBA and EVA grafted polymers, with it improving somewhat when the fumaric acid content is increased from 0.15% to 0.5%. The adhesion of EBA and EVA to ethylene/vinylalcohol (EVOH) as well as to polyamide (PA-6) is altogether nonexistent, however grafting with fumaric acid effects a remarkable improvement which is greater in the case of EVA. The adhesion to EVOH considerably improves on increasing the fumaric acid content from 0.15% to 0.5%, whereas the adhesion to PA-6 is also good at very low fumaric acid content. The adhesion of fumaric acid-grafted EBA and EVA to EVOH is striking, since very low adhesion values are obtained with acrylic acid (EBA grafted with 0.7% acrylic acid yields 6.2 N/cm).

EXAMPLE 6

In this instance, the testing was accomplished as in Example 5, with the exception that comparisons were made with commercial adhesion plastics.

It is seen in Table VI how EBA and EVA grafted with fumaric acid adhere to various materials, as compared with commercial adhesion plastics:

TABLE VI

| Polymer | Adhesion (N/cm) | | | |
|---|---|---|---|---|
| | PA-6 | EVOH | AL | Fe |
| EBA + 0.15% FA (grafted) | 43.0 | 6.9 | 31.3 | 18.2 |
| EBA + 0.5% FA (grafted) | 50.6 | 21.8 | 34.0 | 32.7 |

TABLE VI-continued

| Polymer | Adhesion (N/cm) | | | |
|---|---|---|---|---|
| | PA-6 | EVOH | AL | Fe |
| EVA + 0.15% FA (grafted) | 70.3 | 18.0 | 34.0 | 25.2 |
| EVA + 0.5% FA (grafted) | 52.5 | 38.2 | 41.7 | 29.3 |
| Primacor 1420 9% AA | 55.0 | 2.6 | 10.3 | 8.3 |
| Nucrel 0903 9% MAA | 23.3 | 1.3 | 7.0 | 3.4 |
| Surlyn 1650 12% MAA + Zn | 71.3 | 0 | 5.5 | 8.1 |
| CXA 3095 | 7.0 | 3.4 | 7.1 | 9.5 |
| Lupolon A 2910 M 4% AA + 7% BA | 36.6 | 3.4 | 6.4 | 7.5 |

These results reveal that equally good or better adhesion to polyamide, ethylene/vinylalcohol, aluminum and steel has been obtained with EBA and EVA grafted with fumaric acid, as compared with competing materials.

The preceding description of the present invention is merely exemplary, and is not intended to limit the scope thereof in any way.

We claim:

1. Modified polyolefine having good adhesion to metals and to polar substances, which comprises an ethylene copolymer selected from ethylene/butylacrylate (EBA), ethylene/ethylacrylate (EEA), ethylene/methylacrylate (EMA), and ethylene/vinylacetate (EVA) being admixed with or grafted to fumaric acid, said modified polyolefine having an acid content of less than 1%.

2. The modified polyolefine of claim 1, being admixed with or grafted to about 0.01–20% by weight of said fumaric acid, based on the weight of the polyolefine.

3. The modified polyolefine of claim 2, being admixed with or grafted to about 0.01–1% by weight of said fumaric acid, based on the weight of said polyolefine.

4. A multi-layer product with good interlayer adhesion, comprising at least one layer of modified polyolefine having good adhesion to metals and to polar substances, said modified polyolefine comprising an ethylene ethylene/ethylacrylate (EEA), ethylene/methylacrylate (EMA), and copolymer selected from ethylene/butylacrylate (EBA), ethylene/vinylacetate (EVA) being admixed with or grafted to fumaric acid, and one or more layers of metal or polar substance.

5. The multi-layer product of claim 4, wherein the polar substance is polar plastic.

6. The multi-layer product of claim 4, additionally comprising at least one unmodified polyolefine layer.

7. The multi-layer product of claim 4, being a multi-layer film, a multi-layer tube, or a multi-layer bottle.

8. The multi-layer product of claim 5, wherein the polar plastic layer is polyamide, polyester or EVOH.

9. The multi-layer product of claim 4, wherein said layer is of metal and said metal is steel, aluminum or copper.

10. Modified polyolefine having good adhesion to metals and to polar substances, which comprises ethylene/butylacrylate (EBA) copolymer, being admixed with or grafted to fumaric acid.

11. The modified polyolefine of claim 10 wherein the amount of fumaric acid is about 0.01–20% by weight of the weight of said copolymer.

12. The modified polyolefine of claim 10 wherein the amount of said fumaric acid is about 0.01-1% by weight of said copolymer.

13. A multi-layer product with good inter-layer adhesion, comprising at least one layer of said modified polyolefine of claim 10, and one or more layers of metal or polar substance.

14. The multi-layer product of claim 13, wherein the polar substance is polar plastic.

15. The multi-layer product of claim 13, additionally comprising at least one unmodified polyolefine layer.

16. The multi-layer product of claim 13, being a multi-layer film, multi-layer tube, or a multi-layer bottle.

17. The multi-layer product of claim 13, wherein said metal layer is steel, aluminum or copper.

18. The multi-layer product of claim 14, wherein the polar plastic is polyamide, polyester or EVOH.

* * * * *